United States Patent [19]

Coughlin et al.

[11] Patent Number: 4,978,650

[45] Date of Patent: Dec. 18, 1990

[54] DESENSITIZING ACTIVATED CARBON SORBENTS TO THE EFFECTS OF HUMIDITY

[75] Inventors: Robert W. Coughlin, Storrs; Edward M. Davis, Cheshire, both of Conn.

[73] Assignee: SymBiotech Incorporated, Wallingford, Conn.

[21] Appl. No.: 232,588

[22] Filed: Aug. 15, 1988

[51] Int. Cl.$^5$ .................... C01B 31/10; C01B 31/08; B01J 20/20
[52] U.S. Cl. .......................... 502/432; 55/74; 423/245.1; 423/460; 423/461; 502/34; 502/50; 502/53; 502/417; 502/434
[58] Field of Search ............... 502/430, 432, 434; 423/460, 461

[56] References Cited

U.S. PATENT DOCUMENTS

| | | | |
|---|---|---|---|
| 2,556,859 | 6/1951 | Vesterdal | 502/432 |
| 2,635,709 | 4/1953 | Archibald et al. | 502/432 |
| 2,721,184 | 10/1955 | Voorhies, Jr. | 502/432 |
| 3,222,412 | 12/1965 | Mason et al. | 502/434 |
| 3,778,387 | 12/1973 | Urbank et al. | 423/460 |
| 4,287,089 | 9/1981 | Convers et al. | 423/461 |

FOREIGN PATENT DOCUMENTS 3618426 2/1987 Fed. Rep. of Germany ...... 502/432

*Primary Examiner*—Paul E. Konopka

[57] ABSTRACT

An activated carbon sorbent in which oxygen has been substantially removed from said carbon by outgassing and said oxygen has been replaced by subsequent reaction of the outgassed carbon with a passivating substance.

10 Claims, No Drawings

DESENSITIZING ACTIVATED CARBON SORBENTS TO THE EFFECTS OF HUMIDITY

The U.S. Government has rights in this invention as a result of the investigations leading to this invention being funded in part by contract number DAAA15-87-C-0066 from the U.S. Department of Defense.

BACKGROUND OF THE INVENTION

1. Field of the Invention

The present invention relates to sorption of various substances from gases, and the fact that the humidity of the gas can impede and adversely affect this said sorption. We have discovered new and improved methods of treating and manufacturing activated carbon in order to convert it to a new, improved form for which the adverse effects of humidity on sorption are eliminated or reduced.

2. Brief Description of the Background

Activated carbon (hereinafter sometimes also referred to as active carbon or as AC) is a highly adsorbent, porous material manufactured from carbonaceous animal, mineral or vegetable matter. The specific surface area of AC is usually several hundred or more square meters per gram, as measured by the BET method. The BET method is named for its originators, Brunauer, Emmet and Teller [J. Amer. Chem. Soc. 60, 309 (1938)] and is explained in the book by J. M. Smith, "Chemical Engineering Kinetics", pp. 329-48, McGraw-Hill Inc., New York (1981). An early disclosure (U.S. Pat. No. 1,497,544 to Chaney) teaches a method of manufacturing AC by subjecting charcoal to differential oxidation to remove exposed hydrocarbons contained therein, followed by limited oxidation to develop high sorption capacity. In said patent Chaney also teaches a method starting with vegetable matter (e.g. coconut shells) and subjecting it first to low-temperature distillation to expel volatile components, then subjecting the residue to differential oxidation (activation) to eliminate exposed hydrocarbons and to develop high sorption capacity. The differential oxidation can be conducted at temperatures in the range of about 800° to 1200° C. using air, oxygen, $CO_2$, steam or other suitable oxidizing reagents. In U.S. Pat. No. 3,876,505, Stoneburner discloses the manufacture of highly porous activated carbon of high specific surface area from coal by heating 30 min. to 18 hr. in air at a temperature between about 150° C. and 215° C., followed by activating the material in a controlled oxygen atmosphere at a temperature between about 1000° and 2000° F. In a very general way, the manufacture of AC usually involves a pyrolytic carbonization step in which the raw material is heated to convert it to carbon and expel volatile hydrocarbons and other compounds by distillation, followed by an activation step in which the carbon is partly oxidized, thereby converting it to a highly porous structural form that has a large specific surface area. Similarly, AC that has been saturated with an organic sorbent can be regenerated by various combinations of distillation, pyrolysis and activation steps.

Active carbons are highly effective sorbents for treating and removing impurities from gases and liquids, owing to the high porosity and high specific surface area of AC. Said high porosity and surface area are usually produced by an activation process in which tiny pores are burned into the carbons by oxidation with reactants such as steam, air, carbon dioxide or mixtures thereof. Activated carbon usually contains oxygen atoms chemically attached to its surface in the form of functional groups such as the lactones, quinones, phenols and carboxylates reported by Ishizaki and Marti [Carbon 19, 409-12(1981)]. As early as 1863 Smith [Proc. Royal Soc. 12, 424(1863)] found that charcoal binds oxygen chemically. The presence of such chemically bound surface oxygen on AC can originate, at least in part, from the activation process.

It is known that water vapor or humidity in gases, including air, can interfere with the sorption of organic compounds from those gases by activated carbons. Accounts of this adverse effect of humidity on sorption of organic compounds by activated carbon may be found in the following references:

Grant, Joyce & Urbanic, p.219 in "Fundamentals of Adsorption" Proceedings of Engineering Foundation Conference, Deutsche Vereinigung fuer Verfahrenstechnik, 1986.

Walker & Thomson, Naval Research Laboratories Memorandum Report 5791, 20 May 1986.

Nelson, Correia and Harder, Am. Indust. Hygiene Journal, pp. 280-288, May 1976.

Adams, et al, Carbon 26, No. 4, 451-59 (1988).

Generally, sorption of certain molecules by AC is known to be influenced by the chemically bound oxygen on the surface of the carbon. It may be speculated that water vapor in a humid gas adsorbs preferentially on AC by hydrogen bonding at surface oxygen sites on the carbon. It may be speculated further that clusters of water molecules form by hydrogen bonding at such sites and interfere, perhaps by physical blockage, with the adsorption of organic molecules by the carbon.

Another problem with AC arises when it is used to sorb organic substances such as solvents that need to be recovered. During the desorptive recovery process, many such substances degrade or polymerize and it is believed that these undesirable degradation or polymerization reactions are catalyzed by the chemisorbed oxygen groups on the AC. The surface oxygen groups on carbon can be acidic or basic.

A number of authors have discussed the influence of surface-bound oxygen on the sorptive and catalytic properties of activated carbon, including:

Coughlin, I & EC Product R & D 80, 12(1969).

Oda and Yokokawa, Carbon 21, 303-309(1983).

Coughlin, Ezra & Tan, Environ. Sci. & Tech. 2, 291 (1968).-

Jankowska et al, Carbon 21, 117-120(1983).

Matsumura et al, Carbon 23, 263-271(1985).

Barton et al, Carbon 22, 265-272(1984).

Boehm and Knoetzinger cited in the following paragraph.

It is known [see for example p 151 of Boehm and Knoetzinger in Catal. Sci. & Tech. (ed. by Anderson & Boudart) 4, 39-207, Springer Verlag, Berlin (1983)] to remove surface oxides from carbons by heating them under vacuum. However, deoxygenating carbons by such outgassing produces a material with a highly reactive and unstable surface that, upon re-exposure to air or moisture or both, will react rapidly to reform surface oxides.

Matsumura et al [Carbon 23, pp 263-271 (1985)] treated activated carbons to remove hydrophilic structures by the following procedure: first, the AC was washed with concentrated hydrochloric acid and then with concentrated hydrofluoric acid to remove metallic ions and then thoroughly rinsed with water. It is likely that contacting the carbon with hydrofluoric acid caused chemical reaction between the surface oxygen groups on the carbon and the said acid, thereby producing additional changes in the carbon beyond the removal of metals. Subsequently, a 30-g sample was put in a quartz cell, evacuated and heated in a furnace at 1000° C. for 30 min, then put into contact with hydrogen of about 500 torr at 1000° C., and again evacuated. This treatment process was repeated a few times, and finally the product material was cooled slowly to room temperature in the hydrogen atmosphere. Matsumura et al found that their treatment decreased the adsorption affinities of their treated AC for methanol and water, but not for benzene. They did not study the influence of humidity upon sorption of organic molecules on AC treated by their method. Surprisingly, and in spite of the procedure described by Matsumura et al, we have found that their expensive, inconvenient and time-consuming steps of treatment with concentrated mineral acids to remove metal ions and then washing, are not necessary to desensitize activated carbons to the deleterious effects of humidity upon sorption of organic molecules. In fact, by our methods disclosed hereinbelow, we have been able successfully to reduce the adverse effects of humidity upon sorption of organic substances by active carbons which contain substantial concentrations of metal ions. Contrary to any implications of the teaching of Matsumura et al, we have not had to remove said metals in order to desensitize active carbons to the deleterious effects of humidity upon sorption of organic compounds.

Mazur et al [J. Am. Chem. Soc. 99, pp 3888-91 (1977)] freed synthetic carbon fibers of surface oxides by pyrolysis at 1020° C. in a vacuum of $10^{-5}$ torr, a procedure called vacuum-outgassing. After cooling to room temperature, Mazur et al exposed their vacuum-outgassed samples of carbon fibers to vapors of a variety of substances including oxygen, propane, ethylene, propylene, isobutylene, allene, cyclopentadiene, methylacrylate, acrylyl chloride and vinyl bromide. All of these substances were found to adsorb irreversibly on the deoxygenated synthetic carbon fibers. Mazur et al did not work with activated carbons and did not investigate sorption.

Attar discloses in U.S. Pat. No. 4,597,769 a process for demineralizing coal in which the surface forces between organic and inorganic phases of the coal were reduced by exposing the coal to a mixture of alcohol and acidic gas at temperatures between 100° and 250° C. for up to 300 min.

It appears that the prior art does not teach the manufacture or preparation of activated carbons that resist the deleterious effect of humidity upon the sorption of organic substances. Neither does the prior art teach how to treat activated carbons to make them so resistant.

The prior art described above does not disclose any improved active carbon sorbent resistant to the deleterious effects of humidity on the sorption of organic molecules, nor teach any method of making such an improved activated-carbon sorbent. In spite of the above described prior art, there remains a need for improved activated carbon sorbents resistant to the adverse effects of humidity.

SUMMARY OF THE INVENTION

An object of the present invention is to provide improved activated carbon sorbents that are resistant to the deleterious effects of humidity upon the sorption of organic substances thereon.

It is another object of this invention to provide an improved activated carbon sorbent having been treated in a first step to remove surface oxides thereby forming a chemically active surface, said carbon having been also treated in a subsequent passivating step by reaction with certain substances; the latter passivating step stabilizes the carbon against further reaction with water or air and thereby also causes the carbon to resist better the deleterious effects of humidity upon sorption of organic substances on the carbon.

It is yet another object to provide improved AC sorbents diminished in surface oxides, and therefore also of diminished catalytic activity for undesirable reactions of organic compounds, expecially during desorptive recovery of organic compounds sorbed on the AC.

It is still another object of this invention to provide an improved, metal-containing activated carbon sorbent from which surface oxides have been removed and the resulting chemically active carbon passivated by reaction with certain substances, thereby stabilizing said carbon as in the object described above.

Yet another object of this invention is to provide a packed bed of improved active carbon of increased breakthrough time for the removal of organic compounds from humid air.

Still another object of this invention is to provide methods of treating activated carbon sorbents to make them more resistant to the deleterious effects of moisture or humidity upon sorption of organic compounds.

It is yet another object of this invention to provide methods of treating activated carbon sorbents to remove surface oxides and to passivate the resulting active surface thereby formed, by chemical reaction of the de-oxygenated carbon with molecules which stabilize it.

It is still another object of this invention to provide an improved manufacturing process for making activated carbon sorbents which are resistant to the deleterious effects of humidity upon sorption of organic compounds.

Another object of this invention is to provide an improved manufacturing process for making activated carbons which have reduced populations of chemisorbed oxygen on their surfaces, which surfaces have also been passivated in chemical reactivity after they have been de-oxygenated, by reacting them chemically with molecules which stabilize them.

According to the present invention, the above and other objects of this invention, which will hereinafter become more readily apparent, have been achieved by an activated carbon low in population of surface oxides and with its surface stabilized by reaction with certain passivating molecules. In an exemplary embodiment, the treatment comprises, first, an out-gassing step to remove chemically bound oxygen from the surface of the active carbon by maintaining the AC, at a temperature in the range of about 700° to about 1100° C. and at a total pressure in the range of about 0.1 to about 2.0 atmospheres, in a stream of a de-oxygenating gas such as nitrogen for a period of about several minutes to about several hours, followed by cooling in a de-oxygenating gas to the temperature of the next, passsivating step, followed in turn by a step in which chemical reaction with a passivating substance such as ethylene occurs at a total pressure of about one atmosphere and a temperature of about 50° to about 350°° C. for a period between about several minutes and several hours, in order to stabilize the highly active carbon surface produced by the first step. After the reaction with the passivating substance, the carbon is cooled to room temperature in a de-oxygenating gas such as nitrogen. Such treatment de-oxygenates the surface of the activated carbon and then passivates the surface to stabilize it so it will not readily react subsequently with water vapor or oxygen in air.

In another exemplary embodiment, activated carbon is manufactured by an improved process in which, after the usual carbonization and activation steps, the active carbon is maintained under a de-oxygenating gas such as nitrogen at about the same temperature as used in the activation step, at a pressure of about 0.1 to about 2.0 atmospheres, and for a period of about several minutes to about several hours, followed by cooling in a de-oxygenating gas to a temperature between about 50° and 350° C., followed by reaction of the carbon with a passivating substance such as ethylene for about several minutes to several hours in the approximate temperature range of 50° to 350° C. and the approximate pressure range of 0.1 to 2.0 atmospheres, followed by cooling to room temperature in a de-oxygenating gas.

DESCRIPTION OF THE PREFERRED EMBODIMENTS

According to the present invention, activated carbon is first de-oxygenated by outgassing it in a suitably non-reactive or reducing atmosphere at elevated temperature, thereby producing an AC with a chemically very reactive surface that can react readily with many substances; after the outgassing step, the de-oxygenated active carbon is cooled in a de-oxygenating gas or an inert gas and then contacted in a second step with a passivating substance which reacts with the highly reactive, de-oxygenated carbon surface to stabilize it against further chemical reaction and to produce reaction products on the surface which are not hydrophilic. In a subsequent third step, the active carbon is cooled to room temperature in a non-oxidizing environment provided by a de-oxygenating gas or an inert gas.

In the prior art, de-oxygenation by outgassing is usually accomplished by heating carbon in a vacuum. We have found, however, that heating the carbon in a flowing stream of inert gas such as nitrogen, helium or argon is a more convenient alternative, especially when beds of carbon are to be treated. The gas employed for de-oxygenation need not be always entirely inert. Any gas which does not oxidize carbon and does not adversely react with carbon, and which promotes or permits removal of oxygen from the carbon, is suitable for this de-oxygenation step, e.g. nitrogen, argon, hydrogen, methane or mixtures thereof can be used in the de-oxygenation step. Such a gas is referred to herein as a de-oxygenating gas and includes inert, non-reacting gases such as helium or nitrogen as well as reducing gases such as hydrogen which promote de-oxygenation. Mixtures of such gases can also be used. De-oxygenation by outgassing is best performed at pressures ranging from a vacuum up to a few atmospheres and at temperatures ranging from about 600° to 200° C. and for times ranging from a few minutes to several hours.

Passivating or stabilizing the highly reactive surface of de-oxygenated carbon is best accomplished with a reactant which contains no or only very little oxygen so as not to re-introduce hydrophilic oxygen groups onto the carbon. However, this passivating reactant need not be completely free of oxygen as we have found that ethanol reacts effectively to passivate the surface of de-oxygenated carbons thereby de-sensitizing them to the adverse effect of humidity on the sorption of organic molecules. The passivating reactants should preferably not form hydrophilic groups on the surface of the carbon, or they should at least form fewer or more weakly interactive hydrophilic groups than were originally on the carbon. Moreover, passivating agents should not form large bulky molecular structures which could block pores of the active carbon. Suitable passivating reactants include olefinic monomers such as ethylene, propylene, butene, acrylonitrile, styrene and derivatives of olefins, ethanol and other alcohols up to a carbon number of about eight, hydrogen, di-enes such as butadiene, allene, alkyl amines, aldehydes, halides and the like, and mixtures thereof. Olefins, low-molecular-weight alcohols and hydrogen are preferred passivating reactants. During the passivating step the passivating reagents can also be mixed with an inert or a de-oxygenating gas. Air, water or $CO_2$ are not suitable passivating substances because they react to reform hydrophilic oxygen groups on the carbon. The best conditions of the stabilization reaction will vary, depending on the reactivities of the de-oxygenated carbon surface and of the stabilizing reagent employed. The following ranges of conditions are suitable for the stabilization reaction: temperatures from room temperature up to about 500° C., with room temperature to about 250° C. preferable; pressures from about a few torr to several atmospheres, with about 0.1 to 2.0 atmospheres preferred; times of reaction ranging from about a minute to about ten hours, with several minutes to several hours preferred. After the stabilization reaction, the activated carbon should be cooled in a non-oxidizing atmosphere to room temperature. A preferred non-oxidizing atmosphere is a stream of nitrogen at a total pressure in the range of about 0.1 to 2.0 atmospheres.

It is important not to conduct the stabilizing reaction for too long a time, or under extreme reaction condition, especially with reagents that can polymerize. We have found that if the stabilizing reaction conducted with olefins, for example, is allowed to proceed too extensively, this can adversely affect the adsorption properties of the active carbon product. Presumably, reactions carried out too extensively can lead to excessive accumulation (e.g. polymers) on the carbon which may block pores of the carbon to access by sorbate molecules.

The present invention is not limited only to the treatment of already manufactured activated carbons. It can be also introduced into the overall manufacturing process for activated carbons, or into regenerating processes, by adding a de-oxygenating step, a chemical stabilizing or passivating step and a cooling step in a non-oxidizing atmosphere formed by a de-oxygenating gas, after the activation step of prior art processes for manufacturing or regenerating activated carbon. Processes for manufacturing activated carbon are described in *Active Carbon* by M. Smisek and S. Cerny, pp 10–48, Elsevier Publishing Company, New York, 1970. Typical active-carbon manufacturing processes include those described in U.S. Pat. No. 3,876,505 to, Stoneburner and U.S. Pat. No. 1,497,544 to Chaney, both of which are hereby incorporated herein by reference. The activation step in manufacturing active carbon is usually accomplished by contacting the carbon at elevated temperature (e.g. 900°–1100° C.) with a stream of oxidizing gas such as oxygen, $CO_2$ or steam. The improvement in manufacturing activated carbon conferred by the present invention is achieved by appending the following sequence of steps after the activation step of a typical manufacturing process:

(a) switching from the flow of oxidizing gas after activation of the carbon is complete, to a flow of another, de-oxygenating gas (e.g. nitrogen or hydrogen) which contacts the carbon and thereby permits de-oxygenation of the carbon to occur, (b) maintaining the carbon in a de-oxygenating gas at temperatures in the range of about 700° to 1200° C. and pressures in the range of zero to about 2 atmospheres for a time of about a minute to a few hours, (c) cooling the carbon while in a de-oxygenating gas to a temperature in the range of about 30° to 500° C., or in the range of about 30° to 550° C. (d) reacting the carbon by contacting it, in the temperature range of about 30° to about 500° C., or in the range of about 30° to 550° C., with a stabilizing or passivating substance such as ethylene at a total pressure in the range of about 0.1 to 2 atmospheres for a time period in the range of a few minutes to a few hours, (e) cooling the carbon to room-temperature while in a de-oxygenating environment such as flowing nitrogen at about one atmosphere.

Activated carbon can be regenerated after use by thermal pyrolysis and, or, distillation of volatile matter from the carbon. This is sometimes followed by an oxidative re-activation step, similar to that in a typical manufacturing process for AC. The method of the present invention can be applied also as an improvement to a process for regenerating AC, by adding, after either the distillation, pyrolysis or re-activation step of the regeneration process, the steps of de-oxygenating by outgassing, passivating with a suitable passivating substance, and cooling to room temperature in a de-oxygenating gas. The latter types of step which constitute an improvement in a regenerating process, have been already described more fully above for treatment or manufacture of activated carbon.

In some cases it will be more favorable to modify the process for manufacturing active carbons by adding the improvement steps of the present invention as described in a foregoing paragraph, rather than to apply the present invention to already-manufactured activated carbon. The reason for this is that, by adding the de-oxygenation reaction step and the stabilization reaction step to the usual manufacturing process, one avoids the necessity of costly reheating of the active carbon and the need to convey and store the active carbon between its manufacture and a subsequent treatment process to desensitize it to the adverse effects of humidity.

Having now been generally described, the invention will be better understood by reference to the following experimental examples wherein specific procedures falling within the present claims are described.

EXAMPLES

Example No. 1

ASC whetlerite, an active carbon containing added silver, copper and chromium and manufactured by Calgon Carbon Company, was ground and the fraction used in this Example was that which passed through a 65 mesh U.S. Standard screen but was retained on a 170 mesh screen. Whetlerites are more fully described in U.S. Pat. No. 2,920,050 to F. E. Blacet et al. Several grams of this active carbon was placed in a quartz tube and held at about 700° C. for about 4 hours during which time pure nitrogen was passed through the tube at about 100 ml/min and at a total pressure of about one atmosphere. Thereafter, with the nitrogen still flowing, the temperature was reduced to about 200° C. over the course of a few minutes and then an ethylene flow (about 20 ml/min) was introduced into the nitrogen stream for one hour. Total pressure was about one atmosphere. After the ethylene had been turned off the carbon samples were cooled to room temperature in the stream of nitrogen, then transferred to stoppered glass tubes but no other measures were used to prevent the carbons from contacting air.

The treated and untreated ASC whetlerites were loaded into glass tubes to form packed beds with glass wool inserted at each end to hold the carbon in place. Each bed contained about 100 mg of the carbon and was about 0.5 cm in diameter and about 1.5 cm long. Air containing about 84 parts of toluene per million parts of air was passed through these carbon beds at a flow rate of 60 ml/min, and at room temperature and at one atmosphere total pressure. Toluene had been added to the flowing air from a diffusion tube upstream of the carbon beds. In some cases, the air had been prehumidified by bubbling it through temperature controlled water; in other cases dry air was used. The humidity of the air was measured by a hygrometer. Downstream of the carbon bed, the concentration of toluene in the effluent air leaving the carbon bed was monitored by a flame ionization detector.

Breakthrough curves were generated for each carbon sample by plotting as the ordinate the ratio of toluene concentration of the bed effluent divided by the toluene concentration in the feed gas; time was plotted as the abscissa. Breakthrough times were estimated by extrapolating the nearly straight central portions of the S-shaped breakthrough curves to the abscissa; the intersections of these extrapolated lines with the abscissa were recorded as breakthrough times. Sorption capacities of the carbon beds were also estimated from the breakthrough curves by integration. Estimation of breakthrough times and sorption capacities from breakthrough curves is explained in the above-cited Smisek and Cherny reference, pp 361–75, and will be familiar to those of ordinary skill in the art.

The measured sorption properties (breakthrough time and sorption capacity in % by weight) of the untreated and treated ASC whetlerites (ASC) were as follows:

IN HUMID AIR (relative humidity >95%)

|  | Untreated ASC | Treated ASC |
| --- | --- | --- |
| Breakthrough time | 7.8 hr | 13.0 hr |
| Sorption Capacity | 11.2 wt % | 16.3 wt % |

IN DRY AIR (relative humidity >10%)

|  | Untreated ASC | Treated ASC |
| --- | --- | --- |
| Breakthrough time | 16.4 hr | 24.3 hr |
| Sorption Capacity | 21.8 wt % | 28.8 wt % |

Example No. 2

The treatment of the ASC whetlerites was the same as in Example No. 1 except that, in place of ethylene, ethanol at a rate of 1 ml/hr was injected by a syringe pump into the nitrogen feed stream for four hours during the treatment passivation step at 200° C. The results of toluene breakthrough experiments conducted as in Example No. 1 with carbon treated by the present Example were as follows:

IN HUMID AIR (relative humidity >95%)

|  | Untreated ASC | Treated ASC |
|---|---|---|
| Breakthrough time | 7.8 hr | 13.4 hr |
| Sorption Capacity | 11.2 wt % | 16.6 wt % |

IN DRY AIR (relative humidity >10%)

|  | Untreated ASC | Treated ASC |
|---|---|---|
| Breakthrough time | 16.4 hr | 19.8 hr |
| Sorption Capacity | 21.8 wt % | 24.6 wt % |

Example No. 3

BPL activated carbon was obtained from Calgon Carbon Company crushed and sieved as in Example No. 1. It was then treated by the same method of Example No. 1 except that the time of exposure to ethylene during the passivation step was ten minutes instead of one hour. The results of toluene breakthrough experiments conducted as in Example No. 1 were as follows:

IN HUMID AIR (relative humidity >95%)

|  | Untreated BPL | Treated BPL |
|---|---|---|
| Breakthrough time | 8.3 hr | 13.4 hr |
| Sorption Capacity | 20.0 wt % | 19.5 wt % |

IN DRY AIR (relative humidity >10%)

|  | Untreated BPL | Treated BPL |
|---|---|---|
| Breakthrough time | 20.2 hr | 22.4 hr |
| Sorption Capacity | 29.8 wt % | 28.5 wt % |

When reaction with ethylene as in the present Example was increased to 2 hr there was no improvement in breakthrough time compared to the untreated BPL carbon, and a lowered sorption capacity was observed. When the reaction time with ethylene was increased to ten hours, essentially no improvement was observed compared to the untreated BPL carbon.

Example No. 4

BPL active carbon obtained from Calgon Carbon Company was crushed, sieved and subjected to treatment by outgassing in nitrogen, followed by reaction with ethanol according to the procedure of Example No. 2. The results of toluene breakthrough experiments conducted as in Example No. 1, but using the BPL treated as in the present Example, were as follows:

IN HUMID AIR(relative humidity >95%)

|  | Untreated BPL | Treated BPL |
|---|---|---|
| Breakthrough time | 8.3 hr | 13.2 hr |
| Sorption Capacity | 20.0 wt % | 19.2 wt % |

IN DRY AIR(relative humidity <10%)

|  | Untreated BPL | Treated BPL |
|---|---|---|
| Breakthrough time | 20.0 hr | 17.2 hr |
| Sorption Capacity | 29.8 wt % | 23.0 wt % |

Example No. 5

The carbons of the foregoing Examples were subjected to nitrogen adsorption in order to determine specific surface areas by the BET method, as well as specific microporosity. The results follow:

|  | Surface Area ($m^2/g$) | Micropore Volume (mL/g) |
|---|---|---|
| ASC untreated | 960 | 0.36 |
| ASC treated in Ex. 1 | 1035 | 0.39 |
| ASC treated in Ex. 2 | 992 | 0.38 |
| BPL untreated | 1048 | 0.39 |
| BPL treated in Ex. 3 | 1031 | 0.39 |
| BPL treated in Ex. 4 | 1059 | 0.40 |

It is evident the treatments caused no substantial change in either specific surface area or specific microporosity.

Example No. 6

The carbons of the foregoing examples were held in a desiccator at room temperature and contacted for 24 to 48 hr with the vapors in equilibrium with a saturated solution of $CuSO_4.5H_2O$ in the bottom of the desiccator. Samples of each carbon were then placed in the weighing pan of a thermogravimetric analyzer and heated in a flow of dry nitrogen at a rate of 5° C. per min from room temperature (RT) to 150° C. The weight lost (%) by each carbon during heating in this temperature interval was as follows:

|  | Weight Loss (%) |
|---|---|
| ASC untreated | 6.4 |
| ASC treated in Ex. 1 | 0.0 |
| ASC treated in Ex. 2 | 1.4 |
| BPL untreated | 13.4 |
| BPL treated in Ex. 3 | 12.4 |
| BPL treated in Ex. 4 | 10.2 |

Because the weight lost by the carbons from room temperature to 150° C. can be attributed to loss of water, it is evident from the data of this Example that the treated carbons bound significantly less water than did the untreated carbons. Thus the treatments of the present invention increased the hydrophobicity of the carbons.

Example No. 7

BPL carbon was treated as in Example #1 except that no passivation step was employed. The carbon was outgassed at 700° C. in flowing nitrogen and then cooled to room temperature in flowing nitrogen, but with no intervening passivation step. The result of breakthrough experiments conducted in humid air using the carbon of the present Example with toluene as in Example #1 produced a breakthrough time of about 8.5 hr (close to that of the untreated carbon) and a sorption capacity of only 14.7% (by weight) (substantially less than that of the untreated carbon). The present Example demonstrates the need for a passivation reaction step in addition to an outgassing step to obtain an active carbon of improved sorption properties in humid air.

The invention now being fully described, it will be apparent to one of ordinary skill in the art that many changes and modifications can be made thereto without departing from the spirit or scope of the invention as set forth herein.

What is claimed as new and desired to be secured by letters patent of the United States is:

1. A method of treating oxygen-containing activated carbon sorbents to improve their sorptive performance in humid environments comprising the steps:
   (a) maintaining said activated carbon in contact with a de-oxygenating gas at a temperature between about 600° and 1200° C. and a total pressure between about 0.1 to 2 atmospheres, and for a time period ranging from a few minutes to several hours,
   (b) cooling the activated carbon resulting from step (a) to a temperature in the range of about room temperature to 550° C. while in contact with a de-oxygenating gas at a pressure in the range of 0.1 to 2 atmospheres,
   (c) maintaining the activated carbon resulting from step (b) in contact with a passivating substance chosen from the group consisting of an olefin, an alcohol and mixtures thereof, for a time period ranging from about a minute to several hours at a temperature in the range of about room temperature to 550° C. and a total pressure in the range of about 0.1 to 2 atmospheres whereby said passivating substance is permitted to react with said carbon to stabilize said carbon so it will not readily react with oxygen or water vapor after cooling,
   (d) in the event that step (c) is conducted above room temperature, cooling the carbon resulting from step (c) to room temperature while maintaining it in contact with a de-oxygenating gas.

2. A method according to claim 1 wherein said de-oxygenating gas is chosen from the group consisting of nitrogen, hydrogen, methane, and mixtures thereof.

3. A method according to claim 1 wherein said de-oxygenating gas is an inert gas and said passivating substance is chosen from the group consisting of ethylene and ethanol.

4. A method according to claim 1 wherein said de-oxygenating gas is nitrogen and said passivating substance is ethanol.

5. A method according to claim 1 wherein said de-oxygenating gas is nitrogen and said passivating substance is ethylene.

6. In a process for manufacturing an activated carbon of improved sorptive performance in humid environments, the improvement comprising the steps:
   (a) switching from the activating gas used in the activation step of the manufacturing process to a de-oxygenating gas,
   (b) contacting the carbon resulting from said activation step with said de-oxygenating gas at a temperature in the range of about 600° to about 1200° C. and a total pressure of about 0.1 to 2 atmospheres and for a time period of about a few minutes to several hours,
   (c) cooling the carbon resulting from step (b) to a temperature in the range of about room temperature to about 550° C. while in contact with a de-oxygenating gas,
   (d) contacting the carbon resulting from step (c) with a passivating substance chosen from the group consisting of an olefin, an alcohol and mixtures thereof, at a temperature in the range of about room temperature to about 550° C. and a total pressure in the range of about 0.1 to 2 atmospheres and for a time period of about a minute to several hours, whereby said carbon is stabilized so it will not readily react with water vapor or oxygen after cooling,
   (e) in the event that step (d) is conducted above room temperature, cooling the carbon resulting from step (d) to room temperature while in contact with a de-oxygenating gas.

7. A process according to claim 6 wherein said de-oxygenating gas is chosen from the group consisting of nitrogen, hydrogen, methane and mixtures thereof.

8. A process according to claim 6 wherein said de-oxygenating gas is an inert gas and said passivating substance is chosen from the group consisting of ethylene and ethanol.

9. A process according to claim 6 wherein said de-oxygenating gas is nitrogen and said passivating substance is ethanol.

10. A process according to claim 6 wherein said de-oxygenating gas is nitrogen and said passivating substance is ethylene.

* * * * *